United States Patent

[11] 3,546,350

| [72] | Inventor | James C. Reynolds |
| | | 5534 Plymouth Court, Downers Grove, Illinois 60515 |
| [21] | Appl. No. | 690,511 |
| [22] | Filed | Dec. 14, 1967 |
| [45] | Patented | Dec. 8, 1970 |

[54] TRAINING METHOD AND APPARATUS FOR ILS LANDINGS
4 Claims, 3 Drawing Figs.

| [52] | U.S. Cl. | 35/10.2, 35/12 |
| [51] | Int. Cl. | G09b 19/16 |
| [50] | Field of Search | 35/10.2, 10.4, 12; 343/5(AFC), 108 |

[56] References Cited
UNITED STATES PATENTS

| Re23,627 | 3/1953 | Dehmel | 35/10.2 |
| 2,697,285 | 12/1954 | Dehmel | 25/10.2 |
| 2,715,782 | 8/1955 | Cooper et al. | 35/10.2 |
| 2,809,444 | 10/1957 | Woods et al. | 35/10.2 |
| 3,225,459 | 12/1965 | Wilstein | 35/12 |
| 3,299,197 | 1/1967 | Cutler | 35/10.2 |
| 3,330,051 | 7/1967 | Pambello | 35/12 |
| 3,392,461 | 7/1968 | Jenison | 35/12 |

*Primary Examiner*—Malcolm A. Morrison
*Assistant Examiner*—Felix D. Gruber
*Attorney*—Wood, Herron & Evans ABSTRACT: A self-contained independently powered training device including an instrument panel mountable on an aircraft so as to be visible to a student pilot and a control console connected to said instrument panel by electrical conductors, the control console being operable by an instructor seated in a plane adjacent the student pilot.

INVENTOR.
James C. Reynolds
BY
Wood, Herron & Evans
ATTORNEYS

TRAINING METHOD AND APPARATUS FOR ILS LANDINGS

This invention relates to apparatus and method for training student pilots to make instrument approaches to airports and instrument landings while in flight.

Prior to the present invention, there has been only one realistic way to teach a pilot to make an instrument landing. That requires the use of an aircraft having ILS (instrument landing system) radio equipment and flying that aircraft to an airport having ILS transmitting equipment. There are two major disadvantages to this training method. First, such a radio-equipped aircraft is very expensive and the rental of it for student training is correspondingly expensive. Second, and perhaps more important, is the fact that an airport which has ILS radio equipment is likely to be one of heavy traffic and the use of it to train student pilots presents obvious hazards as well as burdens on the personnel manning the airport control tower.

In addition to the present in-flight method of training student pilots referred to above, there are land trainers in widespread use. The land-based training aids vary from quite simple devices to very sophisticated computerized trainers. But even the best of these cannot simulate true flight conditions wherein the pilot has the "feel" of the aircraft and the several forces affecting it, such as wind with its gusts, gravity and the force of the engine.

It has been an objective of the invention to provide an in-flight training apparatus for training a student pilot in the making of ILS landings. The apparatus is simple and inexpensive and can be carried to and from any aircraft normally used to train pilots, whether or not it has radio equipment.

Further, the invention contemplates a training method using the apparatus wherein the landing procedures can be practiced in any convenient area as, for example, small airports or even isolated farms and the like.

The basic unit of the invention comprises an indicator which preferably is an exact replica of an ILS instrument normally found in a radio-equipped aircraft, the instrument having a vertically oriented needle for indicating the position of the aircraft to the left or right of a glide path and a horizontal needle for indicating the position of the aircraft above or below a glide path. The instrument further includes a control console having at least two knobs operable by an instructor, the control knobs being connected through appropriate electrical circuitry to the needles of the indicator.

In using this basic instrument, the student is hooded so that he can see only the instrument panel, whereas the instructor can see the instrument panel as well as the landscape. The instructor manipulates his control knobs in such a way that the indicator needles portray the attitude of the aircraft with respect to a glide path which the instructor has arbitrarily selected from the surrounding landscape. As the aircraft deviates from the preselected glide path, the instructor causes the needle to reflect that deviation and, as the pilot brings his aircraft back into coincidence with the glide path, the instructor, observing the landscape and the instrument, swings the needles to the central position on the indicator.

It has been another objective of the invention to provide an ADF (automatic direction finder) indicator associated with the ILS indicator and an appropriate control knob for an instructor to operate the ADF indicator. The addition of this instrument to the panel permits the student to practice the execution of landing procedure turn maneuvers which normally immediately precede the ILS landing. In other words, the turn procedure is that which the pilot does to bring his aircraft in line with the ILS runway and at the proper attitude.

The several objectives and features of the invention will become more readily apparent from the following detailed description taken in conjunction with the accompanying drawings in which.

Figure 1:
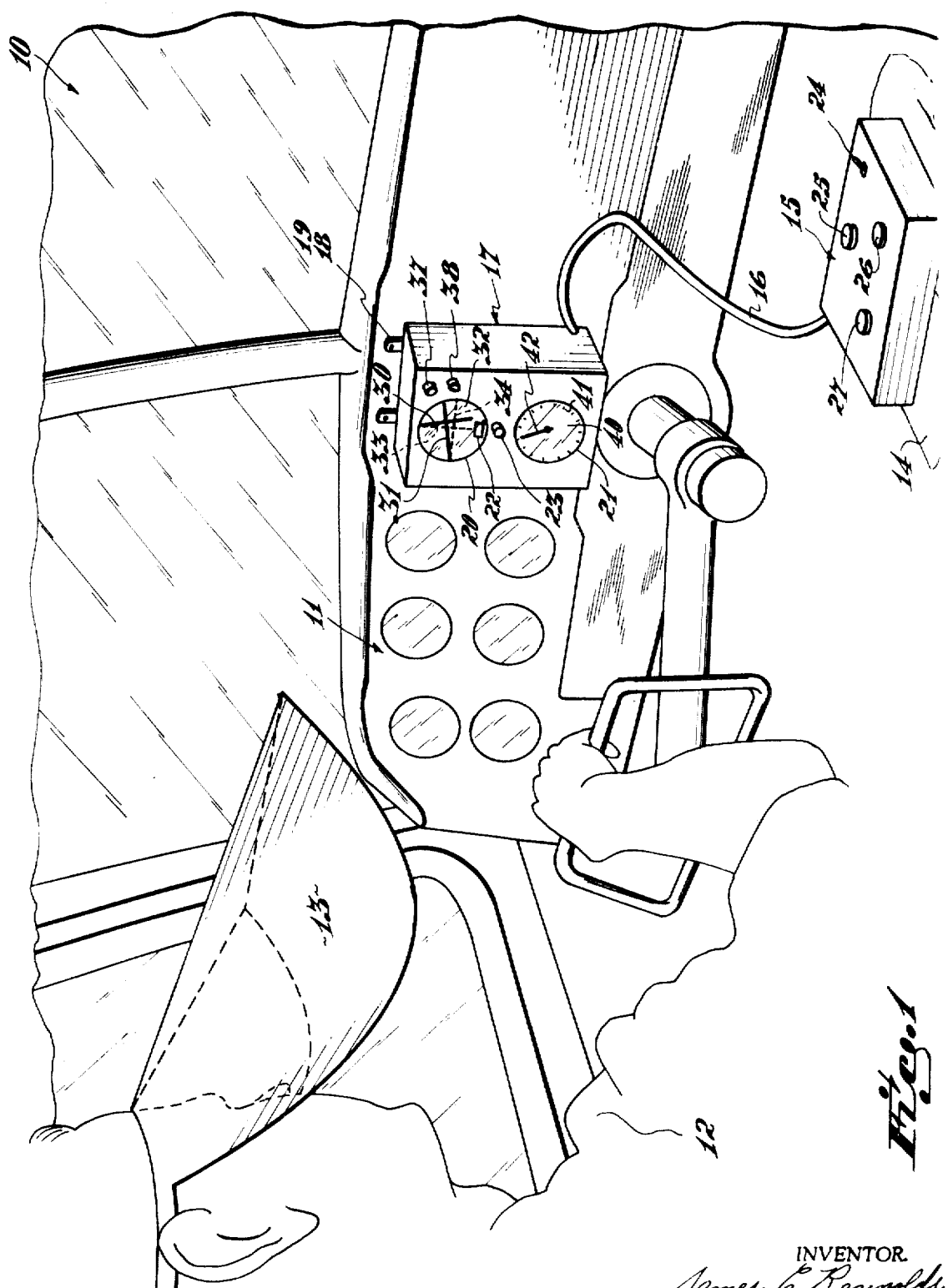
FIG. 1 is a perspective view of an aircraft cockpit, illustrating the invention and the manner in which the invention is used.

Referring to FIG. 1, the aircraft indicated at 10 has an instrument panel 11 in front of a student pilot 12. The student pilot employs a hood 13 which occludes the landscape from his vision so that he is required to fly the aircraft from the instruments alone. This, of course, is standard practice in training pilots for instrument flight. An instructor 14 sits alongside the student pilot and holds the control console 15 on his lap. The control console is connected by electrical conductors forming a part of the electrical circuitry 16 to an instrument panel 17 which is removably mounted to the aircraft instrument panel 11 by brackets 18 and bolts 19.

The instrument panel 17 includes an ILS indicator 20, an ADF indicator 21, a heading indicator 22 and a heading selector knob 23. The instructor's console includes an on-off switch 24, an ADF control knob 25, a vertical ILS knob 26 and a horizontal ILS knob 27.

As shown, the indicator 20 is a standard ILS-VOR (visual omnirange) device. It is contemplated that apparatus constructed in accordance with the invention would employ standard components, these components being upgraded as new instrumentation becomes available and becomes required. The illustrated device has a generally vertical needle 30 and a generally horizontal needle 31. These needles cooperate with the instrument face 32 on which are imprinted a vertical line 33 and a horizontal line 34. The lines 33 and 34 represent the aircraft and the needles represent the desired position of the aircraft, the objective being to bring the aircraft into such an attitude that the needles 30 and 31 overlie the respective position lines 33 and 34. The needle 30 is used not only in ILS landings, but is also used as a heading indicator during the navigation of the aircraft toward the preselected airport.

The ILS indicator 20 may optionally have the heading selector indicated at 22 and control knob 23 cooperating with the heading selector. The panel may also be provided with radio control knobs 37 for high frequency and 38 for low frequency signals to add realism to the navigation instruction as will appear below. Still further, the apparatus can be provided with marker lights and audible signals operable by the instructor, all of which are navigational aids in common use.

The second principal indicator is the ADF indicator 21. It is a radio compass having a face 40 with 360° calibration lines 41. A needle 42 is driven by a reversible direct current motor as controlled by the instructor. In normal practice, the ADF radio compass is operated by a low frequency signal generated from an antenna which is on the center line of the ILS runway. The ADF indicator permits the pilot to fly a course directly over the antenna, and when he passes over the antenna, the needle swings through 180° indicating to the pilot that he has flown over the antenna.

Figure 2:
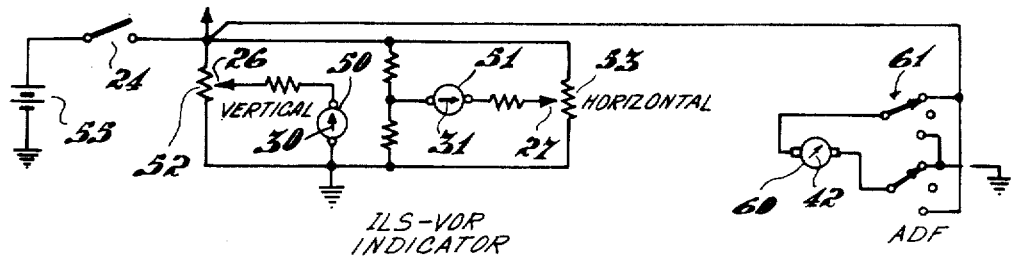
FIG. 2 is a circuit diagram illustrating the electrical control for the invention.

The circuitry for operating the instruments from the control console 15 is shown in FIG. 2.

The ILS indicator needles 30 and 31 are operated by conventional servomotors 50 and 51 which are in turn controlled by rheostats 52 and 53 which are operated by the control knobs 26 and 27, as indicated. The servomotor circuit is powered by batteries 55 which are connected to the servomotor circuit through the on-off switch 24. The power supply 55 may be a pair of series connected dry cell batteries which develop approximately 3 volts. It is preferred to use a completely independent power supply for the system so as to avoid having to adapt the system for use with the varying power supplies of aircraft and also to avoid having to connect the system in any way into the aircraft circuitry, all of which would require complicated FAA approval.

The ADF radio compass 21 may also be a servomotor, but it is more economical and certainly feasible to use a reversible direct current motor 60 which is connected across the 3-volt source through a double-pole, double-throw switch 61. In one position of the switch, the pointer 42 will rotate clockwise and in the other position of the switch, the pointer will rotate counterclockwise. The switch is mechanically connected directly to the control knob 25 for operation by it.

Figure 3:
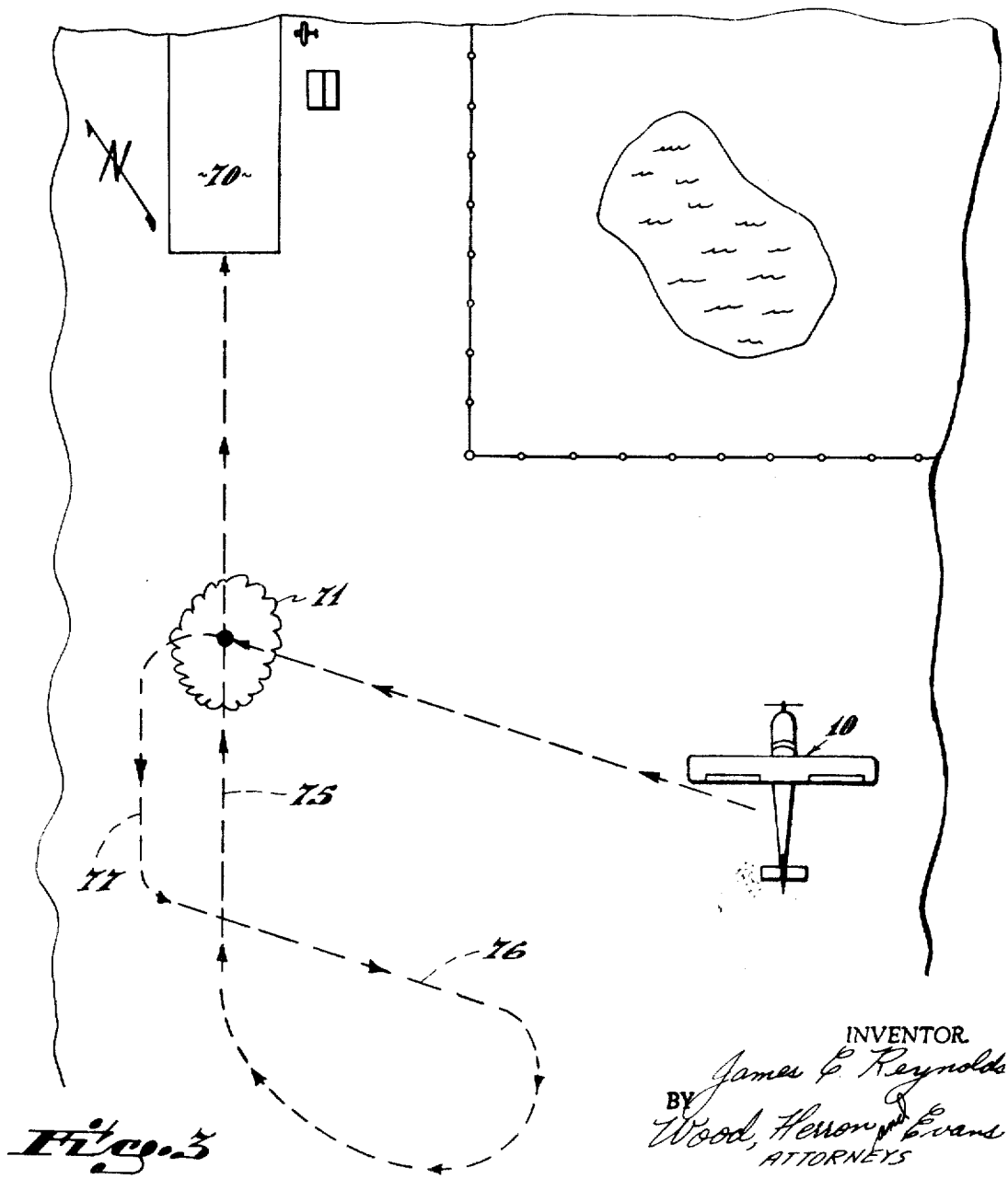
FIG. 3 is a diagrammatic plan view of terrain over which ILS landings may be practiced.

The manner in which the invention is used to provide navigation instruction may again best be understood with reference to FIG. 3. FIG. 3 illustrates a terrain which the instructor has arbitrarily selected to simulate an airport having an ILS runway. It could, for example, be the instructor's own airport or it could be farm land having a dirt road simulating a runway and a tree in line with the roadway simulating the outer compass locator to which the ADF indicator is tuned. In the illustration, the simulated runway is indicated at 70 and the tree which forms the outer compass locator is indicated at 71.

At some location remote from the field of FIG. 3, the instructor would tell the student that his project is to fly to Cincinnati and make an instrument landing. The student would examine his chart and find that the VOR frequency is 112.9 megacycles. This is the frequency of a signal produced at an antenna near the Cincinnati airport. When the ILS-VOR radio control knob, simulated at 23 on the student's instrument panel, is set at that frequency, the vertical needle 30 portrays the relationship of the plane to the VOR antenna and enables the pilot to determine the heading which the plane must take to fly to that VOR antenna. The student pilot rotates heading selector knob 23 and as he does so various flight headings appear in the face 22. In normal practice, when the heading required for the plane to reach the VOR antenna appears at 22, the vertical needle 30 should be aligned with the vertical line 33 on the face of the indicator. To simulate this condition, the instructor, knowing the heading he wants the student to fly to reach his simulated airport, waits until the student has brought the appropriate heading to the window 22 and then the instructor causes the needle 30 to swing to a perfectly vertical position. Thereafter, using his regular magnetic compass, he would fly the selected course. After an appropriate length of time determined by the instructor (and which would be normally determined by means not associated with this invention), the instructor would advise the student that he is cleared for an instrument approach. The student then refers to his approach chart, selects the appropriate frequency for the airport, for example, 109.9 megacycles for his ILS instrument, examines his chart to determine the heading of the runway to be used, then selects the appropriate frequency for his ADF instrument, for example, 219 kilocycles. The student also determines from his chart the required altitude to have when his plane flies over the simulated outer compass locator.

The instructor then manually positions the ADF needle to portray a relative magnetic bearing to enable the student to guide the aircraft from his position to the outer compass locator (the tree 71). The student observes the position of the ADF needle and turns his airplane until the needle points to zero. As the student begins to head his airplane toward the outer compass locator simulated point, the instructor moves the ADF control knob to swing the ADF needle to zero, the needle arriving at zero as the student brings his aircraft to the proper heading. When he arrives over the simulated outer compass locator position, the instructor then moves the ADF needle to the 180° position on the dial which lets the student know that he passed right over the antenna (tree 71) and was going beyond it. The instructor then tells the student to execute a procedure turn maneuver. For example, the student takes up the reciprocal heading 77 of the runway 75 and flies this heading for 30 seconds. He then flies his aircraft on the outbound heading 76 of the procedure turn and holds this heading for 30 seconds. The student then makes a 180° turn and flies the inbound heading 75 of the procedure turn.

During this procedure turn maneuver, the student would correctly adjust his altitude to the published initial altitude on the chart.

The student then flies the inbound heading of the procedure turn until he approaches a position aligned with the runway. At this time, the instructor gradually centers the vertical needle 30 on the ILS indicator and positions the glide path needle 31 fully deflected in the up position. The instructor also positions the ADF needle to zero. The student flies the inbound heading toward the runway and maintains his present altitude. The plane is now heading toward the outer compass locator (tree) lined up with the runway. As the aircraft passes over this outer compass locator site, the instructor causes the horizontal glide path needle 31 to center. The student then starts the aircraft in a descending attitude.

From his chart, the student has determined his required rate of descent. The attitude of the airplane will produce an indication on his vertical rate of climb instrument which should correspond to the required rate of descent. Thus, using conventional instruments, he approximates the required glide path. Then using his glide slope indicator (horizontal needle 31) of the invention he maintains the proper glide path. When the aircraft deviates from the proper glide path as observed by the instructor visually, the instructor will cause the glide path needle to move up or down, depending upon the actual position of the aircraft, to keep both needles centered. Similarly, as the student deviates to the left or right of the glide path, the instructor, visually determining the extent of the deviation, will move the vertical needle in that direction opposite to the deviation of the aircraft as, for example, if the aircraft deviates to the left, the instructor will cause the vertical needle to swing to the right so the student will have to correct to the right. This maneuvering continues until the student reaches a position at which the pilot would normally land the plane visually or execute a missed-approach maneuver.

I claim:

1. In a flying aircraft having a control panel, a navigation training instrument comprising:

an instrument panel including an ILS indicator and motors for driving said indicator;

means mounting said instrument panel on said control panel in said aircraft at a student pilot's station;

an instructor's console including two control knobs, said console being positionable in said aircraft at an instructor's station;

an electrical power supply; and circuit means interconnecting said indicator motors, control knobs, and power supply to permit the operation of said circuit means including electrical conductors extending only between said instrument panel and console, whereby an instructor sitting adjacent a student pilot manipulates his control knobs in response to the observed attitude of the aircraft and the student pilot must observe the instrument panel and control the aircraft to maintain the attitude or change the attitude if the indication of the instrument panel requires such change; said instructor's console forming the only means for controlling said indicator motors.

2. A training instrument according to claim 1 in which said instrument is portable and in which said source of electrical power is contained within the instrument.

3. A training instrument according to claim 1 further comprising an ADF indicator mounted on said instrument panel and a control knob mounted on said instructor's console and electrically connected to said ADF indicator for effecting the operation of said ADF indicator in respect to the operation of the control knob.

4. In a flying aircraft having a control panel, a navigation training instrument comprising:

an instrument panel including an ILS indicator having moveable indicator needles;

means mounting said instrument panel on said control panel in said aircraft at a student pilot's station;

an instructor's console including at least two control knobs, said console being positionable in said aircraft at an instructor's station;

means for connecting said control knobs to said indicator needles to effect movement of said needles in response to the operation of said control knobs, whereby an instructor sitting adjacent a student pilot manipulates his control knobs in response to the observed attitude of the aircraft and the student pilot must observe the instrument panel and control the aircraft to maintain the attitude or change the attitude $O$ if the indication of the instrument panel requires such change; and said instructor's console forming the only means for controlling said indicator needles.